No. 608,186. Patented Aug. 2, 1898.
J. E. DOLDT.
LOCKING DEVICE FOR VEHICLES, &c.
(Application filed July 31, 1895. Renewed Aug. 3, 1897.)

(No Model.) 3 Sheets—Sheet 2.

WITNESSES:
H. Graham
E. L. Todd

INVENTOR
John E. Doldt
BY
Graham Low
ATTORNEYS

No. 608,186. Patented Aug. 2, 1898.
J. E. DOLDT.
LOCKING DEVICE FOR VEHICLES, &c.
(Application filed July 31, 1895. Renewed Aug. 3, 1897.)
(No Model.) 3 Sheets—Sheet 3.
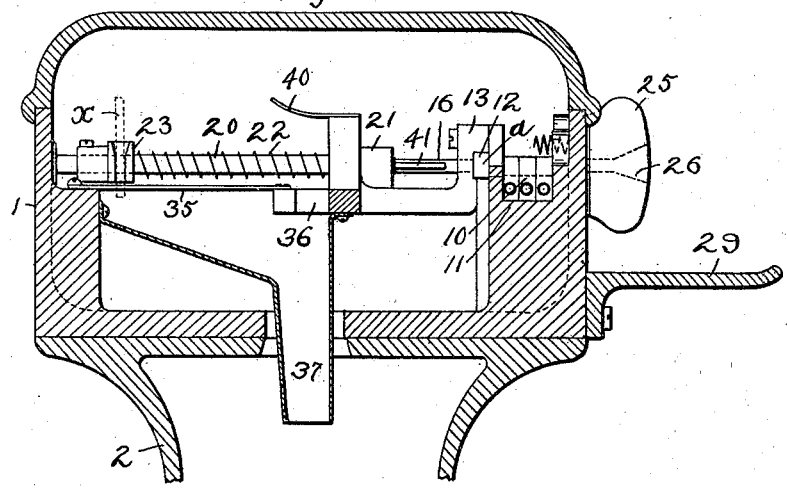
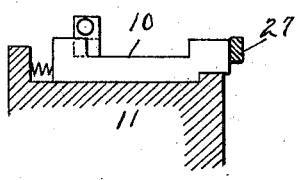
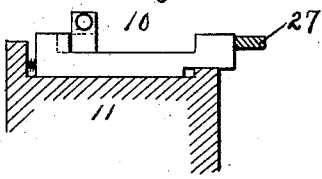
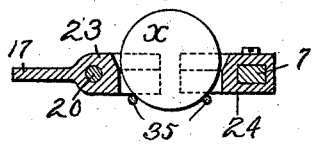
WITNESSES:
H. Graham
E. L. Todd
INVENTOR
John E. Doldt
BY
Graham & Low
ATTORNEYS.

UNITED STATES PATENT OFFICE.

JOHN E. DOLDT, OF EAST ORANGE, NEW JERSEY.

LOCKING DEVICE FOR VEHICLES, &c.

SPECIFICATION forming part of Letters Patent No. 608,186, dated August 2, 1898.

Application filed July 31, 1895. Renewed August 3, 1897. Serial No. 647,001. (No model.)

*To all whom it may concern:*

Be it known that I, JOHN E. DOLDT, a citizen of the United States of America, residing at East Orange, Essex county, and State of New Jersey, have invented certain new and useful Improvements in Locking Devices for Vehicles and other Purposes, of which the following is a specification.

My invention has for its object to provide a conveniently-operated and secure locking device for bicycles or other vehicles or for other purposes where it is desired to temporarily secure in place other articles—such, for instance, as traveling-satchels.

It is a further object of the invention to enable the locking device to be used by any stranger upon the deposit of a fee of predetermined amount, such as a nickel, without the services of any attendant.

The invention consists of a securing device and means for locking said securing device, which means is normally inoperative or prevented from operation, but which upon the insertion of a coin of a predetermined value will be rendered operative.

The invention further consists of means for engaging and securing an article in place which is locked by means of a locking device provided with a key or key-blank, which key or key-blank is normally inaccessible or non-removable, but which is rendered accessible or removable by the insertion of a proper coin.

The invention further consists of the features and combinations hereinafter described and claimed.

In order to make my invention more clearly understood, I have shown in the accompanying drawings means for carrying it into practical effect without limiting my improvements in their useful applications to the particular construction which for the sake of illustration I have delineated.

Figure 1:
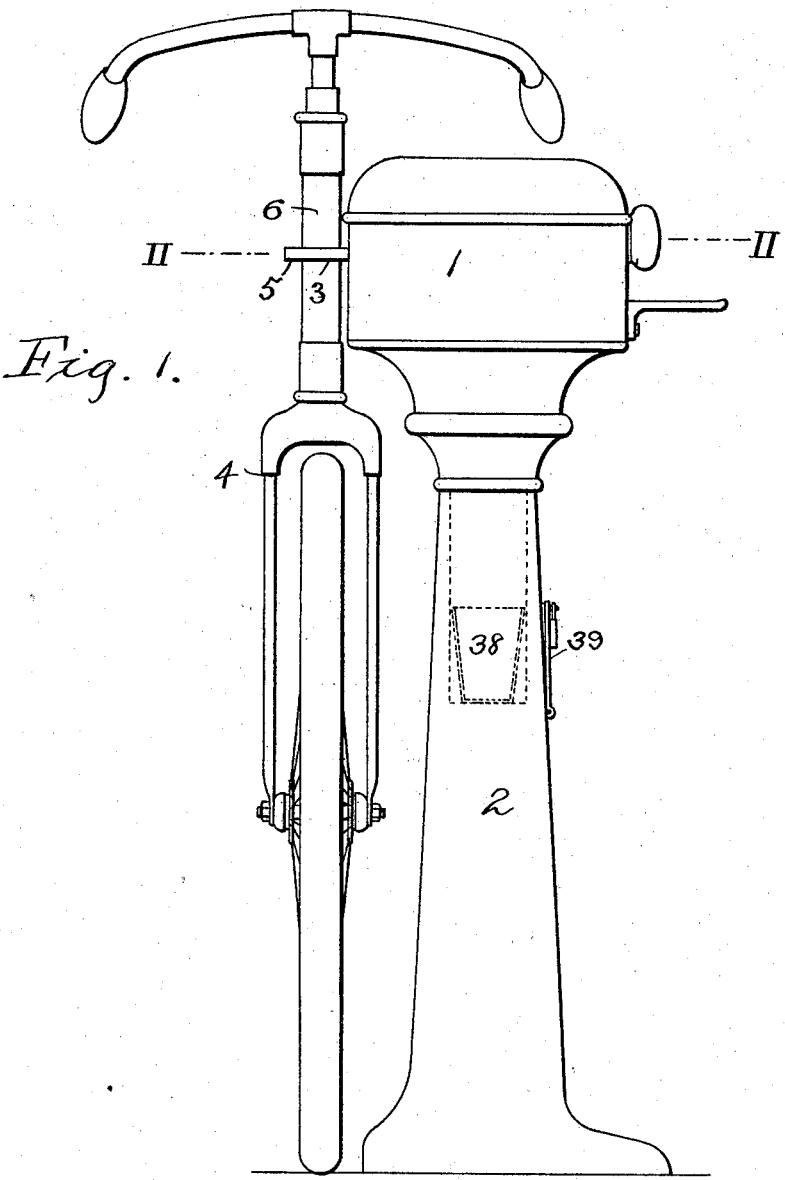
Figure 2:
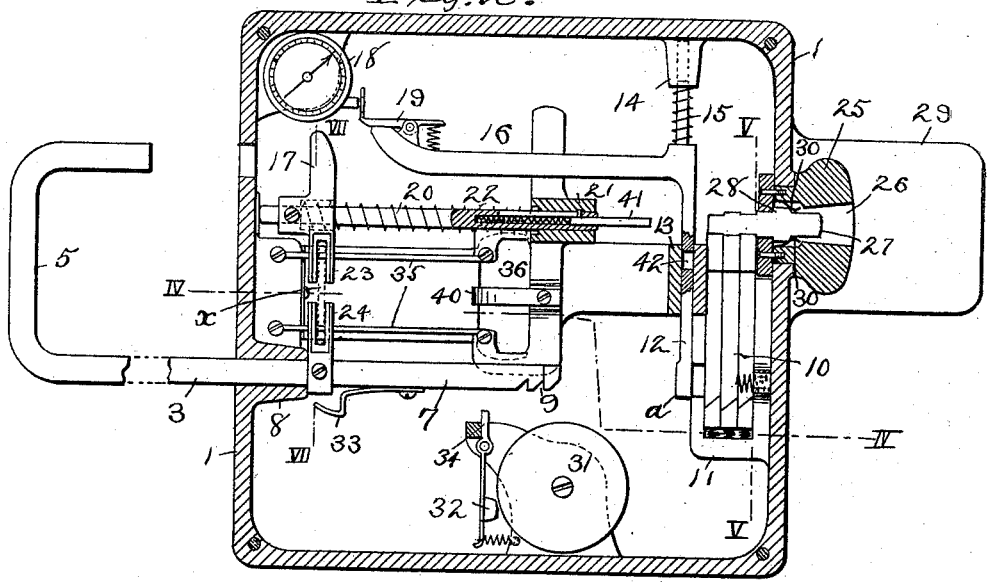
Figure 3:
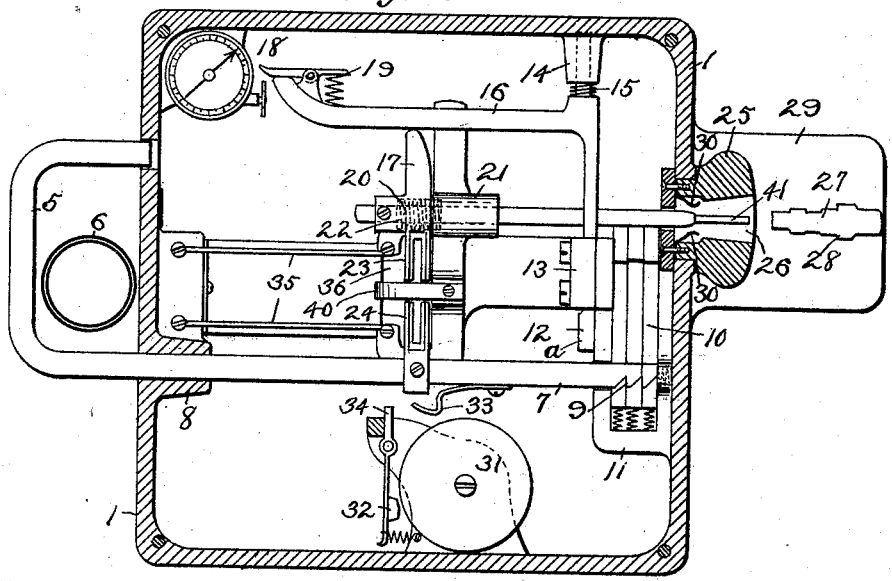

In said drawings, Figure 1 is an elevation of a locking device especially adapted for the securing of bicycles embodying my invention, showing also a bicycle secured in place thereby. Fig. 2 is a sectional view on line II, Fig. 1, the locking-bar being shown in its released position. Fig. 3 is a similar view showing the said bar locked and securing a bicycle and showing also the released key ready for insertion to unlock the bar. Fig. 4 is a vertical sectional view on line IV, Fig. 2. Figs. 5 and 6 are front elevations of the tumblers with the key in cross-section. Fig. 7 is a vertical sectional view of the coin-receiver with a coin in elevation.

Referring to the drawings, 1 indicates a casing of suitable material, such as cast-iron, adapted to contain the operative parts of the locking device and supported at suitable height, according to the purpose for which it is to be used, upon a securely-fixed post or standard 2.

3 indicates the locking bar or staple, projecting and adapted to be moved inward and outward through the casing 1 and shaped to engage the article to be secured. In the construction illustrated the latter is indicated as a bicycle 4, and the bar 3, which is guided in the bearing 8, is formed with an L-shaped or hooked end 5, adapted to encircle the head or steering-post 6 of the bicycle. By arranging the locking-bar at the height indicated it serves not only to lock and prevent the removal of the bicycle, but also as a stand to maintain it in an upright position.

It will be understood that the locking devices will be fixed in public or other places where there will be the greatest demand for their use—such, for instance, as along the sides of streets, in depots, hotels, or bicycle or athletic clubs.

Means are provided for locking the bar in position which may be of any suitable form and, as shown, consist of a shank 7, which is connected to the bar preferably by being formed integral therewith, and tumblers 10, which engage notches or projections on the shank, the notched shank and tumblers thus coöperating to secure the bar in position. These tumblers may be of any desired number and of the ordinary sliding spring-actuated type and are held in a suitable lock-casing 11, attached to or formed with the casing 1. In their normal position the tumblers may be out of line with the notches 9 in the shank of the locking-bar, so that if the latter were thrust inward by itself the tumblers would not engage it; but suitable tumbler-actuating mechanism would be provided adapted to be operated by the locking-bar in conjunction with a coin of the right denomination, by which mechanism the tumblers may be brought into position to secure the locking-bar. I prefer, however, to leave the tumblers normally in line with the locking-bar and ready to engage it, but to so stop or obstruct the latter that it cannot, without the deposit of the required fee, reach the tumblers. Such mechanism comprises, by preference, a slide 12, adapted to obstruct the locking-bar by means of a stop or plate $a$, said slide being mounted in bearings 13 and 14, supported from the casing 1, and being normally pressed by a spring 15 into such position as to normally keep the stop $a$ in the path of the locking-bar.

16 is an arm or cam fixed on the slide 12 and adapted to be engaged by a sliding or movable tappet 17 and to be caused to operate the slide, as aforesaid. I may utilize the arm 16 to actuate a register 18, for instance, through the medium of a pawl 19, so that an inspection of the register will show the number of times that the locking device has been used. The tappet 17 is fixed on a slide 20 in the form of a rod, which is mounted in one or more bearings 21 and controlled by a spring 22. Attached to the slide 20 is one member 23 of the coin receiver or socket, the other member 24 of which is fixed on the shank 7 of the locking-bar. When a coin (indicated at $x$) is dropped through a slot or aperture in the casing 1 into the receiver 23 24, Figs. 2 and 7, it will serve to connect the locking-bar with the slide 20, so that the thrusting inward of said bar to engage and lock a bicycle will be accompanied by an inward movement of the slide 20 and a transverse movement of the slide 12, the latter carrying the stop $a$ out of the path of the locking-bar and permitting the latter to come into engagement with the notches 9 upon the locking-bar. The parts having arrived in such position, the bicycle cannot be removed except by disengaging the tumblers from the locking-bar.

The unlocking operation I effect, preferably, by the parts now to be described.

25 is a knob mounted in the casing 1, so as to turn freely therein, and having an opening 26, adapted to engage a key 27 in such manner that the latter will be turned with the knob. Such means of engagement may be effected by forming a part of the opening 26 flat or square and making the key with a corresponding flat or square portion 28. The outer end of the key is made smooth, conical, or rounded and without any handle portion, so that it cannot be seized by any instrument through the opening 26 and extracted and can only be removed by the inward movement of the slide 20 in the act of locking. At this latter time the inner end of the slide 20 will strike the inner end of the key and eject the latter upon a platform or receiver 29, whence it may be taken by the owner of the bicycle and kept in his possession until he desires to release it. In order to still further insure that the key be retained within the knob 25 until ejected as aforesaid, I provide the interior of said knob with springs 30, adapted to engage the key, Fig. 2. The key is formed on its inner portion with tumbler-engaging surfaces of any usual or preferred character, which are adapted either as the key is inserted or as it is turned to engage the inner ends of the tumbler-shanks and force the tumblers back out of engagement with the locking-bar 3.

A bicycle or other object or article having been locked as aforesaid and the key 27 delivered to the owner through the aperture 26, the property will be then secure until the key is reinserted in the knob 25 and the latter turned to cause the tumbler-engaging surfaces of the key to force back the tumblers, Fig. 2. The locking-bar 3 may then be drawn out by hand and the bicycle or other property removed.

In order to indicate the operation of the locking device, I prefer to combine with it an audible alarm, such as a bell 31, the hammer 32 of which may be operated by the inward movement of the locking-bar—as, for instance, through the medium of a tripping-arm 33, carried thereby and adapted to engage an arm 34 of the hammer-shank.

In order to prevent a coin of too small denomination being used, I arrange beneath the coin-receiver 23 24 longitudinal supports 35 so spaced apart as to sustain the proper coin in the receiver, but to permit a coin of too small size to drop through without effecting the operation of the locking device. As the locking-bar reaches its innermost position the coin is carried past the inner ends of the supports 35 and permitted to drop through an opening 36, Figs. 2 and 4, into a coin-chute 37. By the latter the coin is delivered into a receptacle 38, whence the accumulated coins may be removed from time to time through a door 39, suitably secured.

A fixed spring 40 serves to force the coin out of the receiver 23 24 in case the two parts of the latter should so grasp the coin as to prevent its freely dropping into the chute.

In order to prevent the key from being ejected until the locking operation is completed, I prefer to provide the slide 20 with a spring-actuated ejector-rod 41, which will be forced back into the slide as it first comes into contact with the plate 12, but which when an opening 42 in said plate comes opposite the ejector will spring forward through said opening and engage and eject the key.

What is claimed is—

1. The combination with means for engaging and securing an article in place, of means made operative by the insertion of a coin for locking said securing means, substantially as described.

2. The combination with means for engaging and securing an article in place, of means for locking said securing means, and coin-controlled means for preventing the operation of said locking means, substantially as described.

3. The combination with means for engaging and securing an article in place, of means for locking said securing means, and coin-controlled means for rendering said locking means operative, substantially as described.

4. The combination with a securing device, of means for locking said securing device, means for governing the action of said locking means embodying two disconnected parts, and means whereby the insertion of a coin connects said parts, substantially as described.

5. The combination with means for engaging and securing an article in place, of means for locking said securing means, and means comprising a coin-receiver for rendering said locking means operative, substantially as described.

6. The combination with means for engaging and securing an article in place, of means for locking said securing means, and means comprising a two-part coin-receiver for controlling the operation of said locking means, substantially as described.

7. The combination with a securing device, of means for locking said securing device in operative position, and means comprising a two-part coin-receiver for controlling the operation of said locking means, one of said parts being connected with said locking means, substantially as described.

8. The combination with means for engaging and securing an article in place, of means for locking said securing means, means for preventing the operation of said locking means, and coin-controlled means for rendering said locking means operative, substantially as described.

9. The combination with means for engaging and securing an article in place, of means for locking said securing means, means for preventing the operation of said locking means, and means comprising a coin-receiver for rendering said locking means operative, substantially as described.

10. The combination with means for engaging and securing an article in place, of means for locking said securing means, means for preventing the operation of said locking means, and means comprising a two-part coin-receiver for rendering said locking means operative, substantially as described.

11. The combination with a securing device, of means for locking said securing device, means for preventing the operation of said locking means, and means comprising a two-part coin-receiver for rendering said locking means operative, one of said parts being connected with said locking means, substantially as described.

12. The combination with means for engaging and securing an article in place, of a device for engaging said securing means, and coin-controlled means for rendering said engaging device operative for locking said securing means, substantially as described.

13. The combination with a securing device, of means for locking the same, a stop for preventing the operation of said locking means, and a coin-controlled means through which said stop may be operated, substantially as described.

14. The combination with a securing device, of means for locking the same, a stop for preventing the operation of said means, and a coin-controlled cam for operating said stop, substantially as described.

15. The combination with a securing device, of means for locking the same, a stop for preventing the operation of said means, a cam for operating said stop, and a coin-receiver connected with said locking means and said cam, substantially as described.

16. The combination with means for engaging and securing an article in place, of key-controlled means for locking said securing means, and coin-controlled means for governing the removal of the key, substantially as described.

17. The combination with means for engaging and securing an article in place, of key-controlled means for locking said securing means, and coin-controlled means for governing the operation of the locking means and the removal of the key, substantially as described.

18. In a locking device for vehicles and other purposes the combination of a locking-bar adapted to engage the vehicle or article, a post or support for said bar, mechanism for locking and releasing said bar having a two-part coin-receiver, one of which parts is carried by the bar, the said parts being adapted to be connected by the coin, substantially as set forth.

19. The combination of a locking-bar, a support for the same, means for engaging and locking said bar, mechanism for preventing and permitting the locking means to come into position, and a coin-receiver having one member connected with the bar and the other member connected with said mechanism, substantially as set forth.

20. The combination of a locking-bar, a support for the same, means for engaging and locking the bar, a transverse slide for stopping or controlling the locking means, a longitudinal slide adapted to engage and actuate the transverse slide, and a coin-receiver having one member connected with the locking-bar, substantially as set forth.

21. The combination of a locking-bar, means for engaging and locking the same, a coin-receiver adapted to be actuated by the locking-bar, and a stop or controlling device connected with and operated by said receiver for permitting or preventing the locking operation, substantially as set forth.

22. The combination of a locking-bar, a support for the same, means for engaging and locking said bar, mechanism for stopping or controlling the locking operation connected with the locking-bar and comprising a coin-receiver, and a register connected with said mechanism.

23. The combination of a locking-bar, a support for the same, mechanism for locking and releasing said bar, a stop which prevents the locking operation, a coin-controlled mechanism through which said stop may be operated, and an alarm adapted to be operated upon the movement of the locking-bar, substantially as set forth.

24. In a locking device for vehicles and other purposes the combination of a locking-bar, means released by a key for engaging and locking the same, means for delivering said key, and a coin-controlled mechanism governing both said locking and delivering means, substantially as set forth.

25. The combination of a locking-bar, means operated by a key for engaging and locking the same, a movable part for holding said key in an inaccessible position and engaging the same to operate it, a key-ejector, and a coin-controlled mechanism governing said ejector, substantially as set forth.

26. The combination of a locking-bar, means operated by a key for locking the same, a rotary key holding and operating device, and means for ejecting the key.

27. The combination of a locking-bar, means operated by a key for engaging the same to lock it, a stop or controlling device for preventing or permitting the locking operation, a coin-receiver connected with said bar and with the said controlling device, a movable part holding said key in an inaccessible position, and means for ejecting the key operated by said receiver, substantially as set forth.

28. The combination of a locking-bar, locking means for the same released by a key, a holder for the key, an ejector for the latter, and means for controlling the ejector operated by the locking-bar, substantially as set forth.

29. In a locking apparatus for vehicles and other purposes the combination of a locking device released by a key, means for locking the same, means for delivering said key, and a coin-controlled mechanism governing said delivering means, substantially as set forth.

30. The combination of a locking-bar, tumblers engaging the same, the rotary knob provided with means for holding a key, and a coin-controlled mechanism governing the accessibility of the key.

In witness whereof I have hereunto signed my name in the presence of two witnesses.

JOHN E. DOLDT.

Witnesses:
W. H. GRAHAM,
GEO. H. GRAHAM.